(12) United States Patent
Culeron et al.

(10) Patent No.: US 10,556,371 B2
(45) Date of Patent: Feb. 11, 2020

(54) GLOSSY CONTAINER

(71) Applicant: The Procter & Gamble Company, Cincinnati, OH (US)

(72) Inventors: Guy Hubert Stephane Sylvain Culeron, Beijing (CN); Shuo Song, Beijing (CN); Ping Wang, Beijing (CN); Liang Yang, Beijing (CN); Chun-chuan Liang, Shanghai (CN)

(73) Assignee: The Procter & Gamble Company, Cincinnati, OH (US)

( * ) Notice: Subject to any disclaimer, the term of this patent is extended or adjusted under 35 U.S.C. 154(b) by 398 days.

(21) Appl. No.: 15/191,767

(22) Filed: Jun. 24, 2016

(65) Prior Publication Data

US 2016/0375624 A1    Dec. 29, 2016

(30) Foreign Application Priority Data

Jun. 26, 2015    (WO) ................ PCT/CN2015/082470

(51) Int. Cl.
*B29C 49/04*    (2006.01)
*B29C 49/22*    (2006.01)
(Continued)

(52) U.S. Cl.
CPC .............. *B29C 49/04* (2013.01); *B29B 7/002* (2013.01); *B29C 49/22* (2013.01);
(Continued)

(58) Field of Classification Search
CPC .................................................... B29C 49/04
See application file for complete search history.

(56) References Cited

U.S. PATENT DOCUMENTS 3,947,180 A * 3/1976 Neumaier ............... B29C 49/06
                                                        425/533
5,128,091 A * 7/1992 Agur ................... B29C 49/0042
                                                        264/129
(Continued)

FOREIGN PATENT DOCUMENTS

EP        0761550 A1    3/1997
EP        0642971 B1    1/1998
(Continued)

OTHER PUBLICATIONS

Supplementary European Search Report and Written Opinion dated Dec. 18, 2018, 9 pgs.

*Primary Examiner* — Galen H Hauth
(74) *Attorney, Agent, or Firm* — Sarah M. DeCristofaro

(57) ABSTRACT

A method of blow molding a glossy article having at least one layer of thermoplastic material. The method comprises the steps of feeding a parison of said thermoplastic material into a mold having an inner surface with at least a portion of SPI finish standard selected from the group consisting of A-1, A-2, A-3, B-1, B-2 and B-3 mold and a first temperature of greater than 55° C.; blowing the parison against the inner surface of the mold to form the article; and subsequently lowering the temperature of the mold to a second temperature of between 10° C. to 55° C. before release of the molded article. The cycle time of the mold ($t_{ct}$) is less than 250 seconds.

12 Claims, 2 Drawing Sheets

(51) Int. Cl.
  B29C 49/48 (2006.01)
  B29B 7/00 (2006.01)
  *B29B 7/94* (2006.01)
  *B29C 49/00* (2006.01)
  *B29K 105/00* (2006.01)
  *B29L 31/00* (2006.01)
(52) U.S. Cl.
  CPC ............ B29C 49/4823 (2013.01); *B29B 7/94* (2013.01); *B29C 49/0005* (2013.01); *B29C 2049/4825* (2013.01); *B29C 2049/4838* (2013.01); *B29K 2105/0005* (2013.01); *B29K 2995/0022* (2013.01); *B29L 2031/712* (2013.01)

(56) References Cited

U.S. PATENT DOCUMENTS

| | | | |
|---|---|---|---|
| 5,522,519 A | 6/1996 | Bergner et al. | |
| 5,993,721 A * | 11/1999 | Kurihara | B29C 49/20 264/40.1 |
| 6,660,216 B1 | 12/2003 | Porter | |
| 6,746,643 B1 | 6/2004 | Kannari | |
| 2007/0178266 A1* | 8/2007 | Dey | B29C 49/0005 428/35.7 |
| 2009/0093568 A1* | 4/2009 | Lacock | B32B 27/18 523/171 |
| 2010/0227119 A1* | 9/2010 | Taha | B05D 1/62 428/141 |
| 2015/0048153 A1* | 2/2015 | Wang | B65D 1/40 229/406 |

FOREIGN PATENT DOCUMENTS

| | | |
|---|---|---|
| EP | 0904925 A1 | 3/1999 |
| EP | 1048436 A1 | 11/2000 |
| EP | 1479614 B9 | 9/2006 |
| JP | S5838126 A | 3/1983 |
| JP | A H03-058809 | 3/1991 |
| JP | A H10-235719 | 9/1998 |
| JP | A H11-188784 | 7/1999 |
| JP | A 2002-079559 | 3/2002 |
| JP | 2013/248798 A | 12/2013 |
| WO | WO 2015/021843 | 2/2015 |

* cited by examiner

GLOSSY CONTAINER

TECHNICAL FIELD

The present invention relates to a glossy blow molded article, and a process for making the article.

BACKGROUND

Blow molded articles or containers made of thermoplastic materials have been used to package a wide variety of consumer products, such as cosmetics, shampoo, laundry, and food. There are multiple requirements for such containers, particularly if they are required to connote a feeling of quality and prestige to consumers. For example, it is generally desirable for such containers to have a smooth exterior surface to enhance visual effects, such as high glossiness and refinement in dullness. The exterior surface of a container is predominantly dictated by the impression of an inner surface of a mold used in shaping the molded container during a blow molding process. To ensure a smooth exterior surface, it is necessary to use a mold with a smooth inner surface. However, this generally poses other challenges, such as compromising ventilation during the blow molding process thus leading to venting lines and wrinkles in the finished article.

Ventilation allows air between the parison (or preform) of thermoplastic and the mold to escape when the plastic expands into the mold cavity. Without this ventilation, trapped air prevents the thermoplastic material from fully contacting the mold, thus leading to unsightly deformations and e.g., venting lines in the final article. Furthermore, poor ventilation is likely to lead to significant temperature build-up in the mold cavity, which can cause other issues, e.g., adhesion of the thermoplastic to the mold, or unsightly burn marks (i.e., small dark brown or black discolorations on the molded container due to excess heats). These issues are particularly problematic for thermoplastic materials like polyethylene (PE) or polypropylene (PP) because such materials generally have a lower melting point and are accordingly more likely to stick onto a mold at traditional processing temperatures (as compared to materials like polyethylene terephthalate (PET)).

Various solutions have been proposed in the art. For example, in some cases, molds with rough interior surfaces are provided, incorporating micropores made by sandblasting to allow air to migrate through the micropores to the mold vents as the thermoplastic inflates. This reduces the air pressure between the expanding thermoplastic and the mold and mitigates temperature build-up. However, use of a rough mold provides a rough exterior surface for the finished article which is undesirable from an aesthetic point of view.

International Publication No. WO 2015/021843 A1, by the Applicant, discloses a method of making a container where an additive with low surface tension is combined with the thermoplastic material when forming the parison. The low surface tension of the additive prevents the thermoplastic material from sticking to the interior mold and prevents excessive temperature build up in the mold. Thus, the finished article has a smooth exterior surface and glossy finish.

Use of such an additive may, however, be undesirable for reasons such as cost and recyclability. In this respect, introduction of an additive results in one extra raw material and at least one extra step in the manufacturing process. Furthermore, properties of the additive may change the surface energy of the final article, making other surface decoration (e.g., use of labels) difficult.

Some alternative manufacturing methods have also been proposed to address some of the problems outlined above. For example, JP 2013/248798 A describes an extrusion blow molded article using a resin (HDPE) having two layers, an outer layer having "high" MFI of 2-2.5 (measured at 190° C., 2.16 kg) and an inner layer having "normal" MFI (assumed to be around 0.3). A mirror mold is used at an initial mold temperature of between 110° C. and 130° C. After extrusion of the resin parison into the hot mold, cold air is circulated inside the parison to cool the molded article.

The process described in JP 2013/248798 A, however has an unsatisfactory cycle time (for heating the mold and cooling the molded article) which is undesirable from a manufacturing efficiency point of view, and that leads to unacceptable shrinkage of the molded article. In this respect, the slow cooling time allows for more polymer crystallization of the thermoplastic material, which results in shrinkage.

Alternatively, it is known to form an article having two or three layers using extrusion blow molding. The outermost layer in this case has relatively high MFI, whereas the inner one or two layers have "normal" MFI. In this respect, the outermost layer is designed to deliver the required glossy appearance together with the high polished mold, whereas the inner layer(s) provide structural melt strength to support the parison formation during the blowing process.

The article is formed using a high polished mold at a standard EBM molding temperature (approx 20° C.). However, the finished molded article is dull (i.e., not glossy) and features venting lines as air becomes trapped between the parison and the mold.

Thus, there is still a need to provide an alternative manufacturing method that addresses some of the problems still being encountered in the art.

SUMMARY

According to the present invention, there is provided a method of blow molding a glossy article having at least one layer of thermoplastic material. The method comprises the steps of:
 a) feeding a parison of said thermoplastic material into a mold having an inner surface with at least a portion of SPI finish standard selected from the group consisting of A-1, A-2, A-3, B-1, B-2 and B-3 mold and a first temperature of at least 55° C.;
 b) blowing the parison against the inner surface of the mold to form the article;
 c) subsequently lowering the temperature of the mold to a second temperature of between 10° C. to 55° C.;
wherein the cycle time ($t_{ct}$) of the mold is less than 250 seconds.

The present inventors have discovered that thermo-cycling (i.e., starting with a mold of relatively high temperature and reducing the temperature during the blow-molding process), enables formation of an article without, or with reduced, flow lines and/or venting marks. This leads to a generally smoother outer surface and an increase in glossiness and refinement in dullness. Without being bound by theory, it is believed that the higher initial temperature softens, or helps to maintain the softness, of the parison as it comes into contact with an inner surface of the mold. This "softness" allows air to more easily pass between the thermoplastic material and the inner surface of the mold, such that it can escape without leaving an impression, for example venting lines, defects or wrinkles, on the exterior surface of the article. The softness also allows the parison to press as closely as possible to the polished inner surface of the mold, thus ensuring the outer surface of the final molded article is as smooth as possible. After the parison has been blown into the mold, the temperature of the inner surface of the mold is lowered within a short period of time to reduce crystallization of resin, thereby minimizing post mold shrinkage or deformation. The lower temperature also facilitates release and easy handling of the molded article, thus ensuring a manufacturing and cost-effective cycle time.

BRIEF DESCRIPTION OF THE DRAWINGS

While the specification concludes with claims, it is believed that the same will be better understood from the following description taken in conjunction with the accompanying drawings in which:

DETAILED DESCRIPTION

Figure 1:
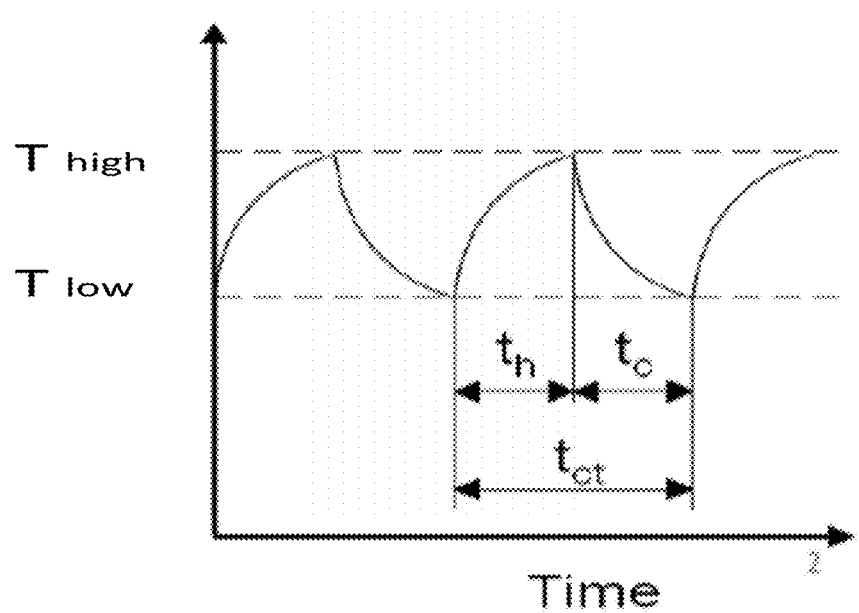
FIG. 1 shows a graph illustrating the process employed in the present invention and the cycle time of heating and cooling the mold.

All percentages are weight percentages based on the weight of the article, or the outermost layer where the article comprises are multiple layers of thermoplastic material, unless otherwise specified. All ratios are weight ratios, unless specifically stated otherwise. All numeric ranges are inclusive of narrower ranges; delineated upper and lower range limits are interchangeable to create further ranges not explicitly delineated. The number of significant digits conveys neither limitation on the indicated amounts nor on the accuracy of the measurements. All measurements are understood to be made at about 25° C. and at ambient conditions, where "ambient conditions" means conditions under about one atmosphere of pressure and at about 50% relative humidity.

In the present invention, it has surprisingly been found that blow molding an article having at least one layer of a thermoplastic material (selected from a group specified below) in a polished mold that has a first high temperature that is subsequently dropped to a lower temperature provides an article with a smooth exterior that exhibits a required amount of glossiness and refined dullness (translating into reduced dullness values). The high temperature of the mold keeps the thermoplastic material soft enough to allow air to escape from between a parison of the thermoplastic material and the inner surface of the mold to avoid the presence of venting lines. As the trapped air is allowed to escape, there is no longer an issue with using a mold of higher temperature as the lack of air or oxygen means there is no fuel to burn and cause burn marks on the exterior of the article.

Definitions

"Article", as used herein refers to an individual blow molded object for consumer usage, eg., a shaver, a toothbrush, a battery, or a container suitable for containing compositions. Preferably the article is a container, non-limiting examples of which include a bottle, a tottle, a jar, a cup, a cap, and the like. The term "container" is used to broadly include elements of a container, such as a closure or dispenser of a container. The compositions contained in such a container may be any of a variety of compositions including, but not limited to, detergents (e.g., laundry detergent, fabric softener, dish care, skin and hair care), beverages, powders, paper (e.g. tissues, wipes), beauty care compositions (e.g., cosmetics, lotions), medicinal, oral care (e.g., tooth paste, mouth wash), and the like. The container may be used to store, transport, or dispense compositions contained therein. Non-limiting volumes containable within the container are from 10 ml, 100 ml, 500 ml or 1000 ml to 1500 ml, 2000 ml, 4000 ml or 6000 ml.

"Blow molding" refers to a manufacturing process by which hollow cavity-containing plastic articles are formed. The blow molding process begins with melting or at least partially melting or heat-softening (plasticating) the thermoplastic and forming it into a parison or preform, where said parison or preform can be formed by a molding or shaping step such as by extrusion through a die head or injection molding. The parison or preform is a tube-like piece of plastic with a hole in one end through which compressed gas can pass. The parison or preform is clamped into a mold and air is pumped into it, sometimes coupled with mechanical stretching of the parison or preform (known as "stretch blow-molding"). The parison or preform may be preheated before air is pumped into it. The air pressure pushes the thermoplastic out to conform to the shape of the mold containing it. Once the plastic has cooled and stiffened, the mold is opened up and the part is ejected. In general, there are three main types of blow molding: extrusion blow molding (EBM), injection blow molding (IBM), and injection stretch blow molding (ISBM).

"Layer" as used herein means a macro-scale layer of the material forming an article. Typically, the macro-scale layer has a thickness of from about 0.01 mm, 0.1 mm or 0.2 mm to about 1 mm, 5 mm or 10 mm "By weight of one layer" refers to the percentage of the ingredient by weight of the layer where it is present, rather than by weight of the whole article (unless, of course, the whole article is formed of a single layer).

"Liquid" includes gel matrices, liquid crystals, etc. Liquids may be Newtonian or non-Newtonian, and may exhibit a yield point, but flow under sufficient shear stress under standard temperature and pressure conditions.

"Pearlescent agent" as used herein refers to a chemical compound or a combination of chemical compounds of which the principle intended function is to deliver a pearlescent effect to a packaging container or a composition.

"Polish" as used herein means smoothing a surface by rubbing. In this case, the surface is the inner surface of a mold that is polished to result in a particular exterior surface finish of a molded article. The term "mold finish" refers to the surface texture and/or smoothness of the inner surface of a mold. SPI mold finish standard is a widely accepted standard in the industry for defining the polishing grade. SPI mold finish defines different grades of surface smoothness for achieving different mold finishes, including A-1, A-2, A-3, B-1, B-2, B-3, C-1, C-2, C-3, D-1, D-2 and D-3, in which the standard starting with the letter A refers to a smooth surface and the standard starting with the letter D refers to a very rough surface. Typically molds having finish standards A or B are polished, whereas molds having finish standards C or D are first polished then sandblasted. The numbers 1, 2 and 3 indicate increasingly rough surfaces.

"Processing temperature" as used herein refers to the temperature used to melt the polymer material in the extruder machine before it is pushed through the die head (to form a parison). During the blow step, the temperature of the material will eventually approach the temperature of the mold cavity. The processing temperature is typically higher than the melting point of the material. Different thermoplastic materials typically require different processing temperatures, depending on factors including: melting point of the material, blow molding type, etc. The processing temperature is much higher than the mold temperature which is traditionally from about 10 to 30° C. Thus, when the material is expanded by air pressure against the surface of the mold, the material is cooled by the mold and finally achieves a temperature equal to or slightly higher than the mold temperature.

"Roughness" as used herein is a measure of the surface texture. It is quantified by the deviations in the direction of the normal vector of a surface in its ideal form (i.e., entirely smooth/flat). If the deviations are large, the surface is considered to be rough; if small, the surface is considered as smooth. Roughness is typically considered to be the high frequency, short-wavelength component of a measured surface. However, in practice it is often necessary to know both the amplitude and frequency to ensure that a surface is fit for purpose.

Article

The term "article" refers to packaging or a container suitable for containing different compositions, including, but not limited to detergents (e.g., laundry care, dish care, skin and hair care), beverages, powders, paper (e.g., tissues, wipes), beauty care compositions (e.g., cosmetics, lotions), medicinal or oral care products (e.g., toothpaste, mouth wash), etc. The compositions may be liquid, semi-liquid, solid, semi-solid, gel, emulsion, aerosol, foam, gaseous, or a combination thereof. The article may be used to store, transport, or dispense compositions contained therein.

The external surface of the article of the present invention preferably delivers an improved glossiness and refined dullness over other blow-molded articles. In one embodiment, the article herein has a Glossiness Value of from about 70, 75, 80 to 90, 100, 110, according to the test method for Glossiness Value as described below and a dullness value of 0, 5 or 10 to 30, 40 or 50. The article of the present invention further has an exterior surface with improved smoothness, for example with a roughness (Ra) Value of from about 10 nm, 20 nm, 25 nm or 30 nm to about 70 nm, 80 nm, 100 nm to 200 nm as measured using the test method described hereinafter. This decrease in roughness helps contribute to improved glossiness and reduced dullness values.

Mold

The mold of the present invention is intended for use as part of a blow-molding process. As mentioned above, the blow-molding may be any form known in the art, for example, extrusion blow molding (EBM), injection blow molding or injection stretch blow molding, etc.

At least a portion of the mold described herein has an SPI finish standard selected from the group consisting of A-1, A-2, A-3, B-1, B-2 and B-3. Preferably, the portion of the mold has an SPI finish standard of A-1, A-2 or A-3. The person skilled in the art will understand the Ra Value of a mold finish represented by a specific SPI finish standard. For example, a SPI finish standard of A-2 represents a Ra Value of about 30 nm, a SPI finish standard of B-2 represents a Ra Value of about 50 nm, a SPI finish standard of C-2 represents a Ra Value of about 100 nm, and a SPI finish standard of D-2 represents a Ra Value of about 300 nm.

In an embodiment, at least 50%, 60% or 70% to 80%, 90% or 100% of the interior surface of the mold has the same SPI standard finish (and accordingly the same Ra value), thus ensuring the same quality, surface finish and aesthetics, e.g., glossiness, across the entire article. Alternatively, it may be desirable to provide some variation in aesthetics across the article, in which case, different parts of the mold may be provided with different SPI finish values. For example, part of the mold surface may have a matt finish, by using a mold that has sections polished with an SPI finish standard of C or D. Alternatively, part of the mold may have a different texture, picture or logo that may be formed by etching or sandblasting the inner surface of the mold.

Using the present invention, it is possible for surface decoration to be applied to an article without increasing the thickness of the parison. In this respect, to enable good quality transfer of surface decoration from a mold to a molded article, it has been necessary to use a relatively thick parison to slow down cooling of the parison when it comes into contact with the inner surface of the mold so that the parison material remains soft for longer and conforms better with the inner surface of the mold. In the present invention, however, since the inner surface of the mold itself is relatively hot, it is possible to use a parison of any thickness as the parison will remain soft on contact with the inner surface of the mold.

The mold may be formed of any suitable material known in the art, including but not limited to: aluminium, aluminium alloy, copper, copper alloy, and steel. Preferably, the mold is formed of steel.

Blow Molding Process

A first step in the blow molding process is to form a parison (for EBM) or preform (for IBM or ISBM). The thermoplastic material(s) is melted and any additive or adjunct ingredients are added to form a blow mold blend. The molten blow mold blend is then extruded into a hollow tube that is open at one end to form the parison or preform. The parison is then placed in the mold and clamped into position before air is blown into the parison at high pressure to expand the parison to fit the form of the interior of the mold.

In the present invention, the mold is set at a first temperature of greater than 55° C., 70° C., 80° C. or 90° C. before blowing the parison into the mold. To avoid burning the thermoplastic material, the first temperature may be up to a maximum of 100° C., 150° C., 175° C. or 200° C. Preferably, the first temperature of the mold is between 70° C. and 100° C.

All thermoplastic materials have a heat distortion temperature HDT beyond which temperature polymer chains (or part of a chain) are able to slide past each other upon application of force. In order to ensure the thermoplastic parison remains soft when in contact with an inner surface of the mold, it is desirable for the first temperature of the inner surface of the mold to be above the heat distortion temperature of the thermoplastic material of which the parison is formed. Thus, it is preferable that the temperature of the inner surface of the mold is at least about 5° C., 10° C., 15° C. or 20° C. above the heat distortion temperature of the thermoplastic material. Where the parison is formed of multiple thermoplastic materials, the first temperature of the inner surface of the mold should be higher than the heat distortion temperature of whichever thermoplastic material in the parison has the higher heat distortion temperature.

Once air has been blown into the parison causing it to expand to touch the inner wall of the mold, the temperature of the inner surface of the mold is dropped to a second temperature between 10° C., 20° C., 25° C., 30° C. or 35° C. to 40° C., 45° C., 50° C. or 55° C. Preferably, the second temperature is at least about 5° C., 10° C., 15° C. or 20° C. below the heat distortion temperature of the thermoplastic material. If the second temperature is much higher than standard room temperature (around 25° C.), the molded article will continue to cool down once it leaves the mold, resulting in further polymer crystallization and, accordingly, more shrinkage. To ensure sufficient time for the parison to make contact with the inner surface of the mold before the temperature is dropped, the inner surface of the mold should preferably be kept at the first temperature for 1 or 2 seconds after the parison is blown into the mold before the cooling process begins.

The temperature of the inner surface of the mold may be controlled by any known means, for example the mold heating process can be achieved by heating up the whole mold or heating up a thin layer of the inner surface of the mold. Examples of ways in which the mold may be heated include use of hot steam, hot water, or hot oil that is cycled around the mold. Alternatively, a thin layer of the inner surface of the mold may be heated in a non contact way, such as by using electromagnetic response reaction interaction or infrared heating or ultrasonic heating. For example, in an embodiment, induction coils may be embedded into the mold and used for heating and/or cooling the mold. Alternatively, a heating bar may be positioned in the mold prior to introduction of the parison and heated using electromagnetic induction. After removal of the bar, the parison could be introduced into the mold and blown in the normal way. Likewise, there are a number of ways in which to cool the mold, including circling cool water inside inner channels of the mold or directly blow cold air inside the parison. In a preferred embodiment, the temperature of the mold is controlled using Dynamic Mold Temperature Control (DMTC) Heat & Cool (H&C) system. The mold is heated up to the first temperature using electric magnetic induction and cooled using normal cooling water.

The cycle time ($t_{ct}$) is the time taken for the mold to complete a full circle of heating and cooling from a predetermined temperature. Assuming the cycle starts with the mold at room temperature, as shown in FIG. 1, the cycle time is measured as the time for the mold to reach a maximum first temperature ($t_h$) and then be cooled again ($t_c$) to the minimum second temperature. The cycle time is influenced by the respective methods chosen to heat and cool the inner surface of the mold, and the chosen first and second temperatures. For example, using the same heating and cooling techniques, the cycle time may be longer where there is a larger difference between the first and second temperatures.

In an embodiment, the complete cycle time of heating and cooling takes from about 10, 20, 30, 40 or 50 seconds to about 100, 120, 150 or 250 seconds.

In existing commonly used molds, the mold is kept at room temperature, while the thermoplastic material typically has a higher molten temperature. Thus, the cycle time is dictated by the length of time it takes for the blow molded article to drop in temperature until it is roughly the same temperature as the mold. This transition is relatively swift, as the thermoplastic material drops in temperature immediately upon contact with the inner surface of the mold. While this results in a quick cycle time, the thermoplastic material has insufficient time to properly fit to the inner surface of the mold and for air to escape from between the thermoplastic material and the mold before the thermoplastic material solidifies. By contrast, where higher temperature molds are used to overcome problems relating to fit of the thermoplastic material and ventilation of trapped air, it takes considerably longer for the molded article to drop to room temperature, which results in shrinkage (discussed above) and an inefficient manufacturing time.

Thermoplastic Materials

The article of the present invention has at least one layer (where the article has multiple layers, the one layer will be the outer layer) comprising from 86%, 90% or 95% to about 99.6%, 99.8% to 99.99% by weight of the layer, of a thermoplastic material. The thermoplastic material of this one/outer layer preferably has an MFI of from about 1.0 g/10 min, 2.0 g/10 min, 5.0 g/10 min or 10.0 g/10 min to about 20.0 g/10 min, 25.0 g/10 min, 30.0 g/10 min, 35.0 g/10 min or 40.0 g/10 min), to be determined in part based on the temperature of the inner surface of the mold being used. In this respect, there is a correlation between the MFI of the thermoplastic material and the temperature of the inner surface of the mold. A high temperature mold could be used with a thermoplastic material of any MFI, but a thermoplastic material having a low MFI would require a mold of a certain minimum first temperature to ensure that it meets the minimum requirements of glossiness and smoothness. In this respect, the glossiness and smoothness is in part determined by the softness of the thermoplastic material as it makes contact with the inner surface of the mold. The softness is influenced by the MFI of the parison (or the outer layer of the parison) and the temperature of the inner surface of the mold.

In an embodiment, the article is formed of more than one layer of thermoplastic material. Where the article is formed of multiple layers, the MFI of the inner layer (that comes into contact with the composition being contained therein) will typically be lower than that of the outer layer that sits adjacent the inner surface of the mold. This may be the case even when the choice of thermoplastic material is the same (for example, where the inner and outer layer are formed of the same thermoplastic material, but with different MFI values). Preferably, the inner layer will have an MFI of less than 1.5 g/10 min, 1.25 g/10 min or 1 g/10 min. The article may further comprise additional layers between the inner and outer layer. Where the article has more than two layers, the central layers may have the same or different MFI as either of the inner or outer layers.

The thermoplastic material is selected from the group consisting of polyethylene (PE), polypropylene (PP), polyethylene terephthalate glycol (PETG), polystyrene (PS), polycarbonate (PC), polyvinyl chloride (PVC), polyvinyl dichloride (PVDC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBT), acrylonitrile styrene (AS), styrene butadiene copolymer (SBC), polyhydroxyalkanoates (PHA), polycaprolactone (PLC), polycyanoacrylate (PACA), polyhydroxybutyrate (PHB), copolymer of 1,3-propanediol and p-Phthalic acid, ethylene vinyl alcohol copolymer (EVOH), polymethyl methacrylate (PMMA), extrudable PET, ethylene/vinyl acetate (EVA), ethylene/acrylic acid (EAA), ethylene/methyl acrylate (EMA), ethylene/ethyl acrylate (EEA), ethylene acrylic acid ionomers, cyclic olefin copolymers (COC), polyethylene terephthalate (PET), amorphous PET, polyamides and a combination thereof.

Preferably, the thermoplastic material is PE and is selected from the group consisting of high density polyethylene (HDPE), low density polyethylene (LDPE), linear low density polyethylene (LLDPE), and a combination thereof.

In an embodiment, the thermoplastic material may comprise a mixture of two or more types of thermoplastic material. For example, the article may comprise a blend of PE and PP.

Recycled thermoplastic materials may also be used. For example, the thermoplastic material may include a polymer selected from the group consisting of post-consumer recycled polyethylene (PCRPE); post-industrial recycled polyethylene (PIR-PE); regrind polyethylene; and a combination thereof. In the multi-layer execution, preferably the recycled thermoplastic is used in one of the middle layers, rather than the outer or inner layers.

The thermoplastic materials described herein may be formed by using a combination of monomers derived from renewable resources and monomers derived from non-renewable (e.g., petroleum) resources. For example, the thermoplastic material may comprise polymers made from bio-derived monomers in whole, or comprise polymers partly made from bio-derived monomers and partly made from petroleum-derived monomers.

Additive

The article or a layer of the article may further comprise from about 0.01%, 0.03%, 0.05% or 0.1% to about 1%, 3%, 6% or 8% by weight of the article, of an additive. In a preferred embodiment, the article comprises about 0.8% of an additive. The amount of additive present in the article is low to ensure structural integrity and to allow ease and efficiency of recycling.

A wide variety of additives are suitable for use herein, and may be selected for use based on characteristics such as: state under ambient temperature (namely, liquid or solid or gas), odour characteristic, commercial availability, cost, etc.

Preferably, the additive is selected from the group consisting of an alcohol, oil, siloxane fluid, a slip agent, water, and a combination thereof.

In one embodiment, the additive is an alcohol preferably selected from the group consisting of a diol, triol, and a combination thereof. More preferably, the additive is selected from the group consisting of ethylene glycol, propylene glycol, glycerol, butanediol, butanetriol, poly(propylene glycol), derivatives thereof, and a combination thereof. Most preferably, the additive is glycerol.

In another embodiment, the additive is an oil selected from the group consisting of a plant oil, an animal oil, a petroleum-derived oil, and a combination thereof. For example, the additive could be an animal oil selected from the group consisting of tallow, lard, and a combination thereof. Preferably the additive is a plant oil selected from sesame oil, soybean oil, peanut oil, olive oil, castor oil, cotton seed oil, palm oil, canola oil, safflower oil, sunflower oil, corn oil, tall oil, rice bran oil, derivative and combinations thereof.

In a further embodiment, the additive is a siloxane fluid and may be a linear or branched polymer or copolymer. For example, the siloxane fluid may be a diorganosiloxane having one or more pendant or terminal groups selected from a group consisting of hydroxyl, vinyl, amine, phenyl, ethyl and mixtures thereof. Other suitable siloxane fluids include polydimethylsiloxane homopolymers, copolymers consisting essentially of dimethylsiloxane units and methylphenylsiloxane units, copolymers consisting essentially of diphenylsiloxane units and methylphenylsiloxane units. Mixtures of two or more of such siloxane fluid polymers and copolymers may be used, either as part of a masterbatch, or separately added to the blend of first and second thermoplastic materials.

Additionally or alternatively, the additive may be a slip agent such as erucamide or oleamide, or a combination thereof. Slip agents are known to reduce the coefficient of friction of a material, while maintaining other properties, for example, visual effects associated with different materials. In the present invention, use of a slip agent provides an outer thin coating on the parison which aids with removal of the molded article from the mold. Use of a slip agent would additionally improve scratch resistance properties of a molded article.

In a preferred embodiment, the additive is siloxane fluid, preferably polydimethylsiloxane.

The additive is preferably in liquid form under ambient temperature. Such a liquid additive, on the one hand, enables a more homogeneous blend with the thermoplastic material before the blow molding, and on the other hand, significantly improves the surface smoothness of the container when located on the container's outer surface, versus pearlescent agents that are typically solid.

The additive herein may be either odorous or odorless. In one embodiment, the additive has an odour that matches the perfume of the composition contained in the container, thus attracting users when displayed on shelf or enhancing the perfume performance of the composition when being used. Alternatively, the additive is odourless and therefore does not adversely affect the perfume performance of the composition contained in the article.

The additive preferably has a relatively high flash point, for example a flash point of greater than 100° C., 150° C., 300° C. to about 400° C. or 500° C. Additives having relatively high flash points, particularly higher than the process temperature conditions (e.g., the typical EBM process temperature of 180° C.) are desirable as they allow for a safer manufacturing process.

Incorporating an additive in the article or outer layer of the article enhances the surface smoothness and glossiness of the finished article by reducing the surface tension on the outer surface of the parison.

Adjunct Ingredient

The article of the present invention may comprise an adjunct ingredient present in an amount of from 0.0001%, 0.001% or 0.01% to about 1%, 5% or 9%, by weight of the article. Non-limiting examples of the adjunct ingredient include: titanium dioxide, pearlescent agent, filler, cure agent, anti-statics, lubricant, UV stabilizer, anti-oxidant, anti-block agent, catalyst stabilizer, colourant, nucleating agent, and a combination thereof.

The pearlescent agent herein could be any suitable pearlescent agents, preferably selected from the group consisting of mica, $SiO_2$, $Al_2O_3$, $TiO_2$, $CaCO_3$, $BaSO_4$, $Fe_2O_3$, talc, kaolin, glass fiber, wood plastic composites (WPC) e.g., bamboo in plastic, and a combination thereof. In one embodiment, low amounts of pearlescent agents are used to provide an enhanced glossy effect. For example, the article may comprise less than 0.5%, 0.1%, 0.01% or 0.001% by weight of the article. Without the incorporation of pearlescent agents or minimizing the mounts of pearlescent agents, the glossy container of the present invention avoids the negative impact of pearlescent agents on the surface smoothness of a container, and the recycling issue that use of pearlescent agents may cause.

Figure 2A:
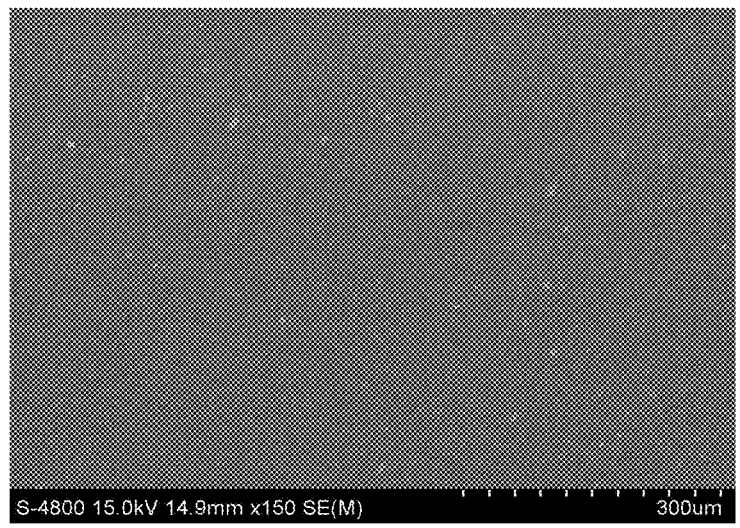
FIGS. 2A and 2B show SEM images comparing the presence of mica when forming an article of the prior art (2A) and the present invention (2B).
Figure 2B:
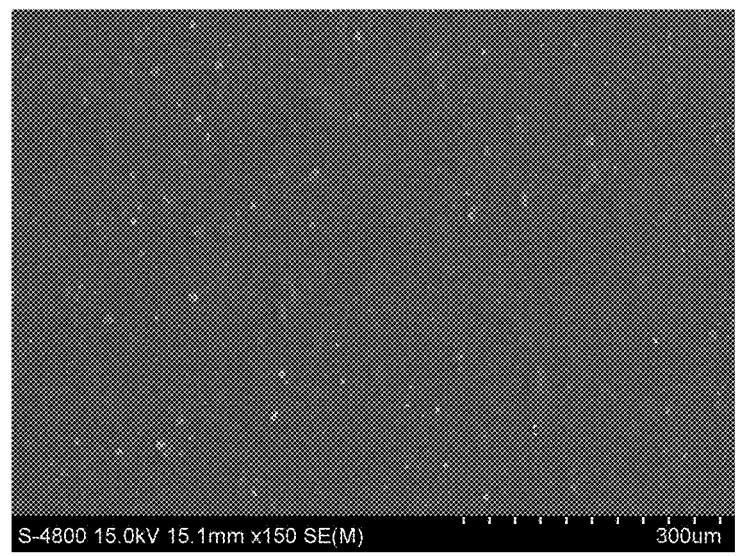

In an embodiment, the size of particles of the pearlescent agent may be up to 100 μm, 200 μm or 300 μm. In the context of the present invention, pearlescent agents with such relatively high particle sizes increase the sparkle-effect provided by the pearlescent agent without compromising the overall smoothness, or roughness, of the exterior of the article. In this respect, and without being bound by theory, as the thermoplastic material comprising the parison remains soft upon contact with the inner wall of the mold, it is possible for the mica particles to remain embedded within the thermoplastic material. By contrast, in the previous blow molding method (where the temperature of the mold is relatively low and the thermoplastic material immediately solidifies upon contact with the mold), the pearlescent agent particles protrude from the outer surface of the article. As the particles increase in size, the greater (negative) impact they would have on roughness values of the exterior surface of the article. This can be seen in FIGS. 2A and 2B. FIG. 2A shows a scanning electron microscopy (SEM) image of an article made in accordance with the present invention and incorporating particles of mica having a size between 5 µm and 50 µm, whereas FIG. 2B shows an SEM image of an article made using the traditional blow molding method. It can clearly be seen in these SEM images that the mica is more visible when using the traditional process.

The container may additionally or alternatively comprise a nucleating agent. Specific examples of the nucleating agent include: benzoic acid and derivatives (e.g., sodium benzoate and lithium benzoate), talc and zinc glycerolate, organocarboxylic acid salts, sodium phosphate and metal salts (e.g., aluminium dibenzoate). The addition of the nucleating agent could improve the tensile and impact properties of the container, as well as prevent the migration of the additive in the container. In the present invention, since the amount of additive is relatively, the article may be substantially free of a nucleating agent, for example having less than 0.1%, 0.01% or 0.001%, by weight of the article, of the nucleating agent.

Parameters
Test Method
Melt Flow Index (MFI)

The melt flow index (MFI) is a measure of the ease of flow of a molten thermoplastic polymer. More specifically, it is defined as the mass of polymer, in grams, that flows over a period of ten minutes through a capillary of a specific diameter and length under pressure prescribed via alternative gravimetric weights, chosen according to different prescribed temperatures. The full test method is described in ASTM D1238 and ISO 1133. For the tests described here, the specific weight is 2.16 kg for both PE and PP, and the temperature used is 190° C. for PE and 230° C. for PP.

Roughness

The surface roughness of a container can be characterized by the Roughness Average (Ra). The Ra Value is measured by MarSuf M400 supplied by Mahr in contact mode. Data is collected as the average value of 10 spots within a detection area (i.e., a surface).

The Ra Value measured in nm can be represented by arithmetic mean value of the absolute height $y_i$ in vertical direction at specific position i. The Ra Value is represented as:

$$R_a = \frac{1}{n}\sum_{i=1}^{n} |y_i|$$

To measure the Ra Value, a sample (in this case a bottle) is placed horizontally on a sample holder (supplied with the equipment). A testing probe is held perpendicular to an external flat surface of the sample and moved along the surface (in parallel with the surface) for a 5 cm distance. In this respect, the probe should be in contact with the sample at all times while the measurement is being taken, thus it is important that the surface being tested is flat. The probe scans the topography of the bottle surface, recording any fluctuations (peaks and troughs) in the topography. Based on this scan, the machine provides a value of Ra, providing an indication of the roughness.

The roughness measure gives an indication of the likelihood of their being venting marks or lines. In this respect, if air is trapped between the parison and the inner surface of the mold, this will cause "bubbling" or other defects in the smooth outer surface of the molded article.

Specula Glossiness

A Rhopoint Novo-Curve Gloss Meter was used to measure Specula Glossiness according to ASTM D523. Gloss is measured by directing a constant light beam at an angle to the test surface and monitoring the reflected light at a 60° angle.

As the container being tested has a curved external surface, four conditions must be met to ensure repeatability and reproducibility of test results, namely:
1. The test area of the package container should fully cover the test window of the Rhopoint machine;
2. The correct gloss value measurement is the peak value identified on the sample. Continuous read mode on the device may be used to generate the final data of specula glossiness.
3. The test samples should be covered by a black box, to ensure no external factors influence measurements.
4. Three results are generated for each sample, and the average reported.

Dullness

Dullness is measured using a Micro-wave-scan instrument provided by BYK-Gardner company, following the manufacturer's instructions. The dullness caused by micro waviness of surface is evaluated by changes of intensity of light reflection around an image edge that is projected on the surface of a sample container. Lower dullness data leads to a higher glossy effect. Mathematically, dullness can be described as equal to scattering divided by a maximum intensity in the center.

The test for measuring dullness is non-destructive as the micro-wave scan instrument is used to directly measure the dullness on the surface of the bottle. The micro-wave-scan instrument is held perpendicular to the bottle surface such that the measurement aperture of instrument is fully covered and a laser is projected onto the bottle surface before a reading is noted from the instrument. For each sample, 6 readings are taken at 6 randomly selected positions, 3 at the front surface and 3 at the back surface of the bottle, while the bottle is held flat to ensure the measurement aperture of the instrument is completely covered. The arithmetic average of these 6 readings is reported in the data table below as the dullness reading.

Examples

The Examples herein are meant to exemplify the present invention but are not used to limit or otherwise define the scope of the present invention. In all examples shown below (both comparative and inventive), the article is formed using extrusion blow molding.

|  | Comparative Sample 1 (JP2013/248798) No physical sample available | Comparative Sample 2 (on-shelf competitor bottle) |
| --- | --- | --- |
| Material (outer layer/inner layer***) | HDPE/PE | PP/PP/PP |

-continued

|  | Comparative Sample 1 (JP2013/248798) No physical sample available | Comparative Sample 2 (on-shelf competitor bottle) |
|---|---|---|
| MFI* of outer layer material | 2-2.5 | Relative high Estimation: 1.5-4 |
| Mold Polish** | Mirror | A1 |
| Mold Temperature (° C.) | 110-130 Cooling to low temperature (but the temperature is not disclosed) Estimation: 40-50 | Normal Estimation: ~20 |
| Specula Gloss (Rhopoint) ASTM 60C | NA | 91.2-93.4 |
| Dullness | NA | 56-57.5 |
| Roughness of outer layer (um) | NA | 0.338 |
| Deformation | Yes | No |
| Cycle Time (seconds)*** | >100 | 30-40 |

*MFI testing of PE @ 190° C., 2.16 kg; MFI testing of PP @ 230° C. 2.16 kg
**A1 and A2 are industrial standard levels of mold polish
***Cycle time is an estimation in all cases based on knowledge of the likely time to heat and cool the mold
****MFI of inner layer of a two-layer parison is typically <1.0 (g/10 min)

|  | Inventive Sample 1 | Inventive Sample 2 | Inventive Sample 3 | Inventive Sample 4 |
|---|---|---|---|---|
| Material (outerlayer/inner layer***) | PP/HDPE | HDPE/HDPE | PP + 0.25% silicone/HDPE | HDPE + 0.25% silicone/HDPE |
| MFI* of outer layer material | 1.5-18 | 2-4 | 1.5-1.8 | 2-4 |
| Mold Polish** | A1 | A1 | A1 | A1 |
| Mold Temperature (° C.) | High End: 70-90 Low End: 40-50 | High End: 70-90 Low End: 40-50 | High End: 70-90 Low End: 40-50 | High End: 70-90 Low End: 40-50 |
| Specula Gloss (Rhopoint) ASTM 60C | 92.8-94.0 | 90.8-91.9 | 93.2 | 92.1 |
| Dullness | 7.0-7.4 | 16.5-20.8 | 6.8 | 15.4 |
| Roughness of outer layer (um) | 0.123 | 0.126 | 0.116 | 0.119 |
| Deformation | No | No | No | No |
| Cycle Time (index)*** | 35-50 | 35-50 | 35-50 | 35-50 |

Based on information provided in JP 2013-248798 A, it is known that the final article of comparative sample 1 suffers from unacceptable shrinkage. Without being by bound by theory, it is thought that the shrinkage results from the long cooling (and accordingly, cycle) time. In comparative sample 2, the relatively high MFI of the outer layer of thermoplastic material provides an acceptable level of gloss. However, while using a standard mold temperature (estimated to be about 20° C.), a significant amount of roughness and dullness can be observed. By contrast, in inventive samples 1 and 2, where the MFI of the thermoplastic material is comparable, the relatively quick transition from a first high temperature to a second low temperature provides a final molded article with acceptable specula gloss, dullness and roughness, with a cycle time that provides for efficient manufacturing.

As can be seen in inventive samples 3 and 4, the inclusion of an additive (in this case silicone) to the outer layer provides less roughness and additional glossiness, in particular when combined with PP.

|  | Thermoplastic Material | MFI | (Mold) First Temperature (° C.) | (Mold) Second Temperature (° C.) |
|---|---|---|---|---|
| Inventive Sample 5 | Ethylene vinyl alcohol copolymer (EVOH) | 5.5-5.7 | 70-90 | 50 |
| Inventive Sample 6 | Ethylene vinyl acetate (EVA) | 1.5-2.5 | 90-110 | 50 |
| Inventive Sample 7 | Surlyn | 0.9 | 120-140 | 50 |

Inventive samples 5, 6 and 7 illustrate the relationship between temperature of the mold and MFI of (at least the outer layer of) the thermoplastic material. Specifically, where the MFI is relatively high (e.g., Inventive Sample 1), a lower first temperature may be used, while still achieving comparable values of specula glossiness, dullness and roughness. By contrast, where the thermoplastic material has a relatively low MFI, to achieve the same criteria, the first temperature must be higher. Thus, it will be understood that using a thermoplastic material with relatively high MFI also helps to keep the cycle time low as it will take less time to cool the mold to the second temperature.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of blow molding a glossy article, the method comprising the steps of:
   providing a parison comprising an outer layer of thermoplastic material and an inner layer of thermoplastic material, wherein the inner layer has a lower melt flow index than the outer layer;
   heating a mold to a first temperature of greater about 55° C., wherein the mold has an inner surface with at least a portion of SPI finish standard selected from the group consisting of A-1, A-2, A-3, B-1, B-2 and B-3 mold, wherein the first temperature is greater than about 5° C. above a heat distortion temperature of the outer layer of the thermoplastic material and the inner layer of thermoplastic material;
   feeding the parison into the heated mold;
   blowing the parison against the inner surface of the heated mold to form the article;
   subsequently lowering the temperature of the mold to a second temperature of between about 10° C. to about 55° C. while an outer surface of the article touches the inner surface of the mold, wherein the second temperature is less than about 5° C. below the heat distortion temperature of the outer layer and the inner layer, and
   wherein the cycle time ($t_{ct}$) of the mold is less than 250 seconds.

2. The method of blow molding a glossy article as claimed in claim 1, wherein the first temperature is less than 200° C.

3. The method of blow molding a glossy article as claimed in claim 1, wherein the first temperature is between 70° C. and 100° C.

4. The method of blow molding a glossy article as claimed in claim 1, wherein the thermoplastic material of the inner layer and the outer layer is selected from the group consisting of polyethylene (PE), polypropylene (PP), polyethylene terephthalate glycol (PETG), polystyrene (PS), polycarbonate (PC), polyvinyl chloride (PVC), polyvinyl dichloride (PVDC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBT), acrylonitrile styrene (AS), styrene butadiene copolymer (SBC), polyhydroxyalkanoates (PHA), polycaprolactone (PLC), polycyanoacrylate (PACA), polyhydroxybutyrate (PHB), copolymer of 1,3-propanediol and p-Phthalic acid, ethylene vinyl alcohol copolymer (EVOH), polymethyl methacrylate (PMMA), extrudable PET, ethylene/vinyl acetate (EVA), ethylene/acrylic acid (EAA), ethylene/methyl acrylate (EMA), ethylene/ethyl acrylate (EEA), ethylene acrylic acid ionomers, cyclic olefin copolymers (COC), polyethylene terephthalate (PET), amorphous PET, polyamides and a combination thereof.

5. The method of blow molding a glossy article as claimed in claim 1, comprising mixing an additive with the thermoplastic material of at least one of the inner layer and the outer layer prior to forming the parison, wherein the additive is selected from the group consisting of an alcohol, oil, siloxane fluid, water, a slip agent, and a combination thereof.

6. The method of blow molding a glossy article as claimed in claim 1, comprising mixing an adjunct ingredient with the thermoplastic material of at least one of the inner layer and the outer layer prior to forming the parison, wherein at least some of the adjunct ingredient is a pearlescent agent having a particle size of up to 300 μm.

7. The method of blow molding a glossy article as claimed in claim 1, wherein the step of heating the mold to the first temperature comprises using heat induction of electromagnetic response or coils embedded within the mold surface.

8. The method of blow molding a glossy article as claimed in claim 1, further comprising heating the mold to the first temperature, wherein a heating bar is temporarily located within the mold prior to introduction of the parison, and the method further comprises heating the bar via electromagnetic induction.

9. The method of blow molding a glossy article as claimed in claim 1, wherein the step of cooling the mold to the second temperature by circulating cooling water within the mold.

10. The method of blow molding a glossy article as claimed in claim 1, wherein the time taken to cool the mold ($t_c$) is less than 175 seconds.

11. The method of blow molding a glossy article as claimed in claim 1, wherein at least 50% of the inner surface of the mold has a SPI finish standard of A-1.

12. The method of blow molding a glossy article as claimed in claim 1, wherein the thermoplastic material of at least one of the inner layer and the outer layer is PE and the method of blow molding is extrusion blow molding.

* * * * *